(12) United States Patent
Abe et al.

(10) Patent No.: US 6,816,322 B2
(45) Date of Patent: Nov. 9, 2004

(54) CEMENTED LENS GROUP

(75) Inventors: Tetsuya Abe, Hokkaido (JP); Kazunori Komori, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/284,362

(22) Filed: Oct. 31, 2002

(65) Prior Publication Data
US 2003/0086184 A1 May 8, 2003

(30) Foreign Application Priority Data

Nov. 1, 2001 (JP) ........................................ 2001-336163
Nov. 1, 2001 (JP) ........................................ 2001-336165

(51) Int. Cl.[7] .............................. G02B 9/00; G02B 9/04
(52) U.S. Cl. ...................................... 359/796; 359/793
(58) Field of Search ........................ 359/642, 793–796; 351/163

(56) References Cited

U.S. PATENT DOCUMENTS

| | | | |
|---|---|---|---|
| 2,092,789 A | 9/1937 | Tillyer | 156/99 |
| 4,168,339 A | 9/1979 | Kerko et al. | 428/220 |
| 4,227,950 A | 10/1980 | Spycher | 156/85 |
| 4,261,656 A | 4/1981 | Wu | 351/163 |
| 4,264,156 A | 4/1981 | Spycher | 351/163 |
| 4,268,134 A | 5/1981 | Gulati et al. | 351/163 |
| 4,679,918 A | 7/1987 | Ace | 351/163 |
| 5,253,111 A | 10/1993 | Chiba et al. | 359/647 |

FOREIGN PATENT DOCUMENTS

JP 53-93245 7/1978

*Primary Examiner*—Georgia Epps
*Assistant Examiner*—William Choi
(74) *Attorney, Agent, or Firm*—Greenblum & Bernstein, P.L.C.

(57) ABSTRACT

A cemented lens group including two lens elements, which are cemented to each other by an adhesive; wherein an adhesive layer formed by the adhesive between the two lens elements has elasticity, and the following condition(1) is satisfied:

$$|\Delta\alpha \cdot D/d| < 0.03 \qquad (1).$$

$\Delta\alpha$ designates a difference in linear expansion coefficient between the two lens elements, D designates the diameter of each of the lens elements, and d designates a thickness of the adhesive layer.

26 Claims, 8 Drawing Sheets

SPHERICAL ABERRATION
THE SINE CONDITION

SPHERICAL ABERRATION
CHROMATIC ABERRATION

SPHERICAL ABERRATION
THE SINE CONDITION

SPHERICAL ABERRATION
CHROMATIC ABERRATION

SPHERICAL ABERRATION
THE SINE CONDITION

SPHERICAL ABERRATION
CHROMATIC ABERRATION

SPHERICAL ABERRATION
THE SINE CONDITION

SPHERICAL ABERRATION
CHROMATIC ABERRATION

SPHERICAL ABERRATION
THE SINE CONDITION

SPHERICAL ABERRATION
CHROMATIC ABERRATION

SPHERICAL ABERRATION
THE SINE CONDITION

SPHERICAL ABERRATION
CHROMATIC ABERRATION

CEMENTED LENS GROUP

BACKGROUND OF THE INVENTION

1. Field of the Invention

The present invention relates to a cemented lens group which can be used in various optical systems.

2. Description of the Prior Art

Achromatic lens groups consisting of at least one positive lens element and one negative lens element which are positioned closely to each other with a slight space therebetween are well-known in the art and used in various optical systems. In such types of achromatic lens groups, each of a convex surface and a concave surface of the two lens elements which face each other with a slight space therebetween has a strong surface power since a strong power is given to each of the positive lens element and the negative lens element to correct axial chromatic aberration. Due to this lens design, if one of the two lens elements becomes eccentric with respect to the other lens element, strong coma aberration and/or flare occur, substantially deteriorating the optical performance of the achromatic lens group. To prevent this problem from occurring, the rim of the lens group and the lens holder thereof have to be made with a high degree of precision so that none of the lens elements become decentered. However, this increases the cost of production.

On the other hand, another type of achromatic lens group which consists of at least one positive lens element and one negative lens element which are cemented to each other is known in the art and used in various optical systems. In this cemented type of achromatic lens group, two lens elements are cemented to each other by an adhesive after the two lens elements are precisely aligned. This achieves an achromatic cemented lens group in which substantially no deterioration in optical performance occurs. However, in the case of a cemented lens group consisting of two lens elements of different glass materials having different thermal expansion coefficients, a variation in temperature causes a difference in outside diameter between the two lens elements. This difference generates a shearing stress exerted on each cementing surface. The shearing stress becomes great, especially when an appreciable variation in temperature occurs. In this case, there is a high possibility that the cemented lens group may become deformed, or in the worst scenario, the cementing surfaces may come off each other (separate) due to the shearing stress.

The difference in the outside diameter between the two lens elements due to a variation in temperature increases as the outside diameter of the cemented lens group increases. Accordingly, the aforementioned problems in cemented lens group become more serious if the cemented lens group has a large diameter. Fluorite and low-dispersion glass have excellent achromatic characteristics, and are often used as materials of high-performance achromatic lens. However, such particular materials have a high thermal expansion coefficient, more than double the thermal expansion coefficient of a typical optical glass material. Accordingly, if a lens element made of such a material having a high thermal expansion coefficient and a lens element made of a typical optical glass material are cemented to each other, the aforementioned problems in the cemented lens group thereof become much more serious.

SUMMARY OF THE INVENTION

The present invention has been devised in view of the aforementioned problems, and accordingly, the present invention provides a cemented lens group consisting of at least two lens elements which are cemented to each other by an adhesive, wherein there is substantially no possibility that the cemented lens group deforms or that the cementing surfaces come off each other by a shearing stress exerted on the cementing surfaces. The present invention is of great value especially when providing a large-diameter cemented lens group, the lens elements of which are made of different glass materials having different thermal expansion coefficients, e.g., a lens element of a typical glass material and a lens element of fluorite or a low-dispersion glass.

The present invention provides an achromatic cemented lens group that requires a high optical performance, wherein the optical performance deteriorates little even if the adhesive layer, via which two lens elements of the cemented lens group are cemented to each other, is elastically deformed.

The present invention provides a cemented lens group wherein the thickness of the adhesive layer between the lens elements can be easily managed.

For example, a cemented lens group is provided, including two lens elements, cementing surfaces of the two lens elements being cemented to each other by an adhesive; wherein an adhesive layer formed by the adhesive between the two lens elements has elasticity; and wherein the following condition (1) is satisfied:

$$|\Delta\alpha\cdot D/d|<0.03 \quad (1);$$

wherein $\Delta\alpha$ designates a difference in linear expansion coefficient between the two lens elements cemented to each other; D designates the diameter of each of the lens elements; and d designates a thickness of the adhesive layer.

It is desirable for the following condition (1') to be satisfied:

$$|\Delta\alpha\cdot D/d|<0.01 \quad (1').$$

It is desirable for the following condition (2) to be satisfied:

$$d/D<0.002 \quad (2).$$

The two lens elements can include a positive lens element and a negative lens element, respectively, wherein the following condition (3) is satisfied:

$$|\Delta v|>20 \quad (3);$$

wherein $\Delta v$ represents a difference in Abbe constant between the positive lens element and the negative lens element.

It is desirable for the following condition (4) to be satisfied:

$$|fc\cdot(1/fp\cdot vp)+1/(fn\cdot vn)|<0.02 \quad (4);$$

wherein fc designates a focal length of the cemented lens group, fp designates a focal length of the positive lens element, fn designates a focal length of the negative lens element, vp designates Abbe constant of the positive lens element, and vn designates Abbe constant of the negative lens element.

It is desirable for the following condition (5) to be satisfied:

$$d>0.015 \text{ mm} \quad (5).$$

It is desirable for the following condition (6) to be satisfied:

$$d<0.2 \text{ mm} \quad (6).$$

It is desirable for the following condition (7) to be satisfied:

$$D > 80 \text{ mm} \qquad (7).$$

It is desirable for the following condition (8) to be satisfied:

$$|\Delta\alpha| > 0.0000015 \qquad (8).$$

The adhesive can be a silicon resin made of an organic silicon compound.

The adhesive can be an addition-reaction silicon resin.

The adhesive can be a silicon resin having an elongation of at least 100 percent.

The cementing surfaces can be a convex surface and a concave surface, wherein a radius of curvature of the concave surface is greater than a radius of curvature of the convex surface.

In another embodiment, a cemented lens group is provided, including two lens elements, cementing surfaces of the two lens elements being cemented to each other by an adhesive. A radius of curvature of each the cementing surfaces is determined so that a space between the cementing surfaces in the vicinity of periphery of the cementing surfaces becomes greater than a space between the cementing surfaces at an optical axis of the cemented lens group. An adhesive layer formed by the adhesive between the two lens elements has elasticity, and the following condition (9) is satisfied:

$$|\Delta\alpha \cdot D/d'| < 0.03 \qquad (9);$$

wherein $\Delta\alpha$ designates a difference in linear expansion coefficient between the two lens elements cemented to each other, D designates a diameter of each of the lens elements, and d' represents a thickness of the adhesive layer at the periphery of the cementing surfaces.

It is desirable for the following condition (9') to be satisfied:

$$|\Delta\alpha \cdot D/d'| < 0.01 \qquad (9').$$

It is desirable for the following condition (10) to be satisfied:

$$d'/D < 0.002 \qquad (10).$$

It is desirable for the cementing surfaces to be cemented to each other after the two lens elements are precisely aligned.

The two lens elements can include a positive lens element and a negative lens element, respectively, and wherein the following condition (3) is satisfied:

$$|\Delta v| > 20 \qquad (3);$$

wherein $\Delta v$ designates a difference in Abbe constant between the positive lens element and the negative lens element.

It is desirable for the following condition (4) to be satisfied:

$$|fc \cdot (1/fp \cdot vp) + 1/(fn \cdot vn)| < 0.02 \qquad (4);$$

wherein fc designates a focal length of the cemented lens group, fp designates a focal length of the positive lens element, fn designates a focal length of the negative lens element, vp designates Abbe constant of the positive lens element, and vn designates Abbe constant of the negative lens element.

It is desirable for the following condition (11) to be satisfied:

$$d' > 0.015 \text{ mm} \qquad (11).$$

It is desirable for the following condition (12) to be satisfied:

$$d' < 0.2 \text{ mm} \qquad (12).$$

It is desirable for the following condition (7) to be satisfied:

$$D > 80 \text{ mm} \qquad (7).$$

It is desirable for the following condition (8) to be satisfied:

$$|\Delta\alpha| > 0.0000015 \qquad (8).$$

It is desirable that the adhesive be a silicon resin made of an organic silicon compound and that the silicon resin be of an addition-reaction type. Alternatively, the adhesive is made of a silicon resin having elongation of at least 100 percent. The term "Elongation" is a technical term of JIS (Japan Industrial Standard), and is represented by the following equation:

$$\text{Elongation}(\%) = (\text{Amount of Extension /original Length}) \times 100.$$

Namely, for instance, elongation of 100% and 150% indicate a length which is two times of the original length, and a length which is two and half times of the original length, respectively.

The radius of curvature of each cementing surface can be determined so that a space between the cementing surfaces increases in radial directions away from an optical axis of the cemented lens group.

The cementing surfaces can be a convex surface and a concave surface, wherein a radius of curvature of the concave surface is greater than a radius of curvature of the convex surface.

The present disclosure relates to subject matter contained in Japanese Patent Applications Nos. 2001-336163 and 2001-336165 (both filed on Nov. 1, 2001) which are expressly incorporated herein in their entireties.

BRIEF DESCRIPTION OF THE DRAWINGS

The present invention will be discussed below in detail with reference to the accompanying drawings, in which.

DESCRIPTION OF THE PREFERRED EMBODIMENTS

Figure 1:
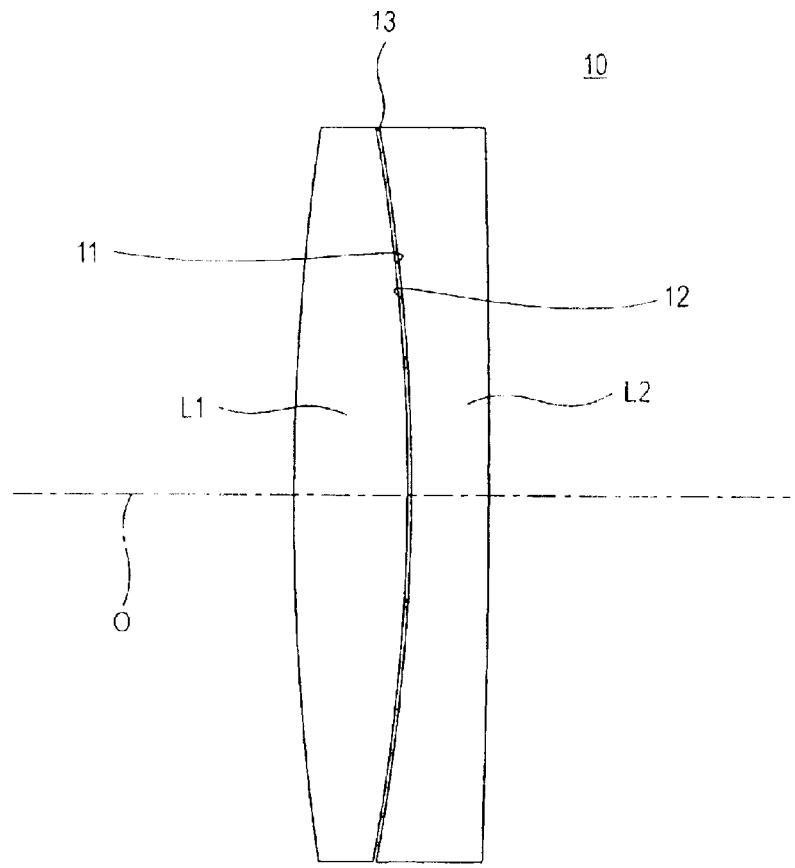
FIG. 1 is a cross-sectional view of a first embodiment of a cemented lens group according to the present invention.
Figure 2:
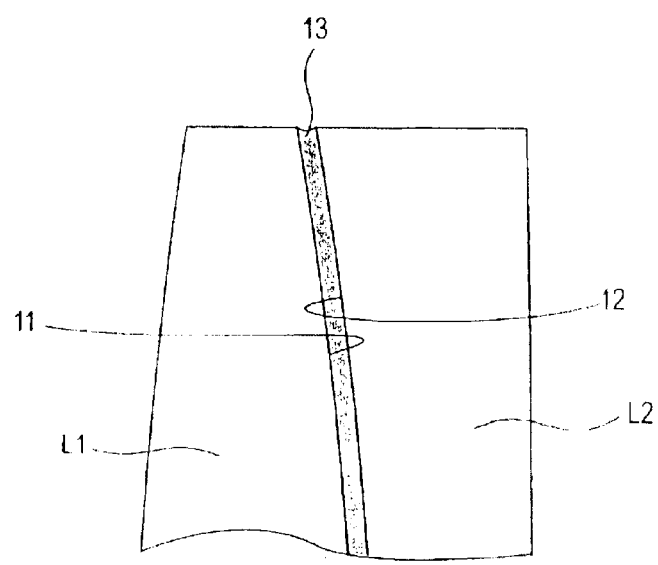
FIG. 2 is a fragmentary cross-sectional view of the first embodiment of the cemented lens group shown in FIG. 1.

FIGS. 1 and 2 show the first embodiment of a cemented lens group according to the present invention. The cemented lens group 10 consists of a first lens element L1 having positive power and a second lens element L2 having negative power, in that order from the object side (the left side as viewed in FIG. 1). A second surface (cementing surface) 11 of the first lens element L1, which is formed as a convex surface, and a first surface (cementing surface) 12 of the second lens element L2, which is formed as a concave surface, are cemented to each other by an adhesive to form the cemented lens group 10. The reference numeral "13" represents an adhesive layer. The cementing surface 11 of the first lens element L1 and the cementing surface 12 of the second lens element L2 are slightly separate from each other by a predetermined space that is filled with an adhesive forming the adhesive layer 13 between the cementing surfaces 11 and 12.

The cementing surface (convex surface) 11 of the first lens element L1 and the cementing surface (concave surface) 12 of the second lens element L2 has the same radius of curvature. Therefore, the thickness of the adhesive layer 13 is even. In other words, the space between the two cementing surfaces 11 and 12 is even. Note that the space between the two cementing surfaces 11 and 12 in FIGS. 1 and 2 is exaggerated for the purpose of illustration.

In the first embodiment shown in FIGS. 1 and 2, the first lens element L1 is made from an optical glass material "FPL53" (product type) produced by OHARA INC., Japan. The second lens element L2 is made from an optical glass material "NSL36" (product type) produced by OHARA INC., Japan. These two lens elements L1 and L2 are cemented to each other to form the cemented lens group 10 serving as an achromatic lens. The diameter of each of the lens elements L1 and L2 is 100 mm.

The cementing surfaces 11 and 12 are formed to have the same radius of curvature, and are cemented to each other so that the thickness of the adhesive layer 13 is 0.1 mm.

An addition-reaction silicon resin "KE109" (product name) produced by Shin-Etsu Chemical Co., Ltd., Japan, is used as an adhesive of the adhesive layer 13, and is cured at 40 degrees centigrade for 12 hours while maintaining the thickness of the adhesive layer 13 at a constant thickness of 0.1 mm.

The thermal expansion coefficient of FPL53 is $142 \times 10^{-7}$. The thermal expansion coefficient of NSL36 is $76 \times 10^{-7}$. Therefore, if the temperature of the cemented lens group 10 drops from 40 degrees centigrade (temperature at cementing time) to 10 degrees centigrade, the first lens element L1 is contracted so that the diameter thereof decreases by 0.043 mm while the second lens element L2 is contracted so that the diameter thereof decreases by 0.023 mm. Consequently, a difference of 0.02 mm in diameter occurs between the first and second lens elements L1 and L2. This difference causes the periphery of the cementing surfaces 11 and 12 to be mutually displaced by 0.01 mm in a radial direction with respect to an optical axis O. This displacement becomes a cause of exerting a shearing stress on the cementing surfaces 11 and 12 in radial directions. The shearing stress is small in the vicinity of the optical axis O, increases in radial directions away from the optical axis O, and is maximum at the outer edge of the cemented lens group.

In conventional cemented lens groups, the thickness of the adhesive layer between two cementing surfaces is approximately a few micrometers by experience. In such conventional cemented lens groups, the adhesive layer cannot fully absorb the aforementioned shearing stress because the magnitude of a radial displacement between the periphery of the two cementing surface due to expansion/contraction of the lens elements reaches several times of the thickness of the adhesive layer. Accordingly, the cemented lens group is deformed if the strength of the adhesive layer is high, or the cementing surfaces may come off each other by the shearing stress if the strength of the adhesive layer is low.

In a cemented lens group consisting of two lens elements cemented to each other, the magnitude of a displacement between the periphery of the cementing surfaces of the two lens elements in a radial direction when the two lens elements expand or contract due to a temperature variation depends on a difference in a linear expansion coefficient between the two lens elements, the diameter of the cemented lens group and a range of temperature variation of the cemented lens group. The magnitude of such a displacement is represented by the following equation (A):

$$\Delta h = \Delta \alpha \cdot D \cdot \Delta T / 2 \qquad (A);$$

wherein $\Delta h$ represents the magnitude of a displacement between the periphery of the cementing surfaces of the two lens elements in a direction radially outwards or inwards when the two lens elements expand or contract due to a temperature variation;

$\Delta \alpha$ represents a difference in linear expansion coefficient between the two lens elements cemented to each other;

D represents the diameter of each of the cemented lens elements; and $\Delta T$ represents the range of temperature variation of the cemented lens group.

If it is assumed that the adhesive layer between the two lens elements has elasticity, and elongation of at least 100 percent, the shearing stress exerted on the adhesive layer can be absorbed sufficiently by the elasticity of the adhesive layer if the thickness of the adhesive layer is more than double the displacement ($\Delta h$). Namely, the shearing stress exerted on the cementing surfaces which is caused by expansion/contraction of the two lens elements can be absorbed sufficiently by satisfying the following condition (B):

$$2 \cdot |\Delta h| < d \tag{B}$$

wherein d represents the thickness of the adhesive layer.

From the equation (A) and condition (B), the following condition (C) is derived:

$$|\Delta \alpha \cdot D/d| < 1/\Delta T \tag{C}$$

The following condition (1) shows a case where the aforementioned condition (C) is satisfied when it is assumed that the range of temperature variation of the cemented lens group is 30 degrees centigrade.

$$|\Delta \alpha \cdot D/d| < 0.03 \tag{1}$$

Accordingly, defining the numerical values of the variables in condition (C) makes it possible for the adhesive layer to sufficiently absorb the shearing stress exerted on the cementing surfaces which is caused by expansion/contraction of the two lens elements.

If $|\Delta \alpha \cdot D/d|$ in condition (1) is equal to or greater than the upper limit (=0.03), the thickness of the adhesive layer becomes so small that the adhesive layer cannot absorb the shearing stress exerted on the cementing surfaces.

The aforementioned specific numerical values of $\Delta \alpha$, D and d satisfy condition (1). In this case, a radial displacement between the periphery of the cementing surfaces 11 and 12 is approximately one tenth of the thickness of the adhesive layer 13 since adhesive layer 13 becomes thick. In addition, the elongation of the aforementioned addition-reaction silicon resin KE109 from which the adhesive layer 13 is made is approximately 150 percent. Accordingly, the adhesive layer 13 can fully absorb a radial displacement between the periphery of the cementing surfaces 11 and 12 which is caused by expansion/contraction of the first and second lens elements L1 and L2.

If the workability of cementing the lens elements, the environment, the optical performance of the adhesive of the adhesive layer, the cost of production and so forth are taken into consideration, an optimum adhesive having an ideal elasticity cannot always be used. In this case, it is desirable that the thickness of the adhesive layer be determined by the following condition (1'):

$$|\Delta \alpha \cdot D/d| < 0.01 \tag{1'}$$

If $|\Delta \alpha \cdot D/d|$ in condition (1') is equal to or greater than the upper limit (=0.01), the thickness of the adhesive layer becomes so small that the adhesive layer cannot absorb the shearing stress exerted on the cementing surfaces, depending on the elasticity of the adhesive of the adhesive layer.

When the lens elements of the cemented lens group are cemented to each other by an adhesive which becomes elastic after being cured, the adhesive layer is deformed by the own weight of each lens element to thereby cause the cemented lens elements to become eccentric with respect to each other if the adhesive layer is excessively thick. To prevent this problem from occurring, defining the thickness of the adhesive layer as an optimum thickness using the following condition (2) makes it possible to reduce the eccentricity.

$$d/D < 0.002 \tag{2}$$

If d/D is equal to or greater than the upper limit (=0.002), the adhesive layer becomes excessively thick, so as to cause the cemented lens elements to become eccentric relative to each other to thereby deteriorate the optical performance of the cemented lens group.

A cemented lens group in which the thickness of the adhesive layer thereof is minimal so that the cemented lens elements do not become eccentric relative to each other is suitable for use as an achromatic lens, the optical performance of which generally deteriorates substantially if the cemented lens elements are eccentric relative to each other. In such a cemented lens group, increasing a difference in Abbe constant between the positive first lens element and the negative second lens element using the following condition (3) makes it possible to finely correct chromatic aberration to further minimize deterioration of the optical performance of the cemented lens group due to the eccentricity.

$$|\Delta v| > 20 \tag{3}$$

wherein $\Delta v$ represents the difference in the Abbe constant between the positive lens element and the negative lens element.

If $|\Delta v|$ in condition (3) is equal to or smaller than the lower limit (=20), a difference in power between the positive lens element and the negative lens element has to be increased to finely correct chromatic aberration. This causes these lens elements to become eccentric relative to each other to thereby deteriorate the optical performance of the cemented lens group considerably.

The following condition (4) specifies a necessary condition for the cemented lens group to serve as an achromatic lens, the chromatic aberration thereof being finely corrected.

$$|fc \cdot (1/fp \cdot vp) + 1/(fn \cdot vn)| < 0.02 \tag{4}$$

wherein fc represents the focal length of the cemented lens group;

fp represents the focal length of the positive lens element of the cemented lens group;

fn represents the focal length of the negative lens element of the cemented lens group;

vp represents Abbe constant of the positive lens element of the cemented lens group; and vn represents Abbe constant of the negative lens element of the cemented lens group.

If $|fc \cdot (1/fp \cdot vp) + 1/(fn \cdot vn)|$ is equal to or greater than the upper limit (=0.02), the chromatic aberration of the cemented lens group is not sufficiently corrected. This type of cemented lens group is not required to be produced with a high degree of accuracy. Accordingly, there is no merit in producing such a cemented lens group according to the present invention in terms of the production cost.

Although the lower limit of the thickness of the adhesive layer is determined by the aforementioned conditions (1) or (1'), the thickness of the adhesive layer can be set to a degree of the thickness of an adhesive layer of a conventional cemented lens group, depending on a difference in diameter between the cemented lens elements of the cemented lens group or a difference in linear expansion coefficient between cemented lens elements of the cemented lens group.

The following condition (5) specifies a condition which defines the lower limit of the optimum thickness of the adhesive layer of the cemented lens group.

$$d > 0.015 \text{ mm} \tag{5}$$

wherein d represents the thickness of the adhesive layer.

If d is equal to or smaller than the lower limit (=0.015 mm), there is no merit in producing such a cemented lens group according to the present invention in terms of the production cost since the thickness of the adhesive layer can be reduced to a degree of the thickness of an adhesive layer of a conventional cemented lens group.

Although the upper limit of the thickness of the adhesive layer is determined by condition (2), there is a possibility of the adhesive layer becoming so thick that the cemented lens elements become largely decentered relative to each other due to an elastic deformation of the adhesive layer, depending on a difference in diameter between the cemented lens elements or a difference in linear expansion coefficient between the cemented lens elements.

The following condition (6) specifies a condition which defines the upper limit of the thickness of the adhesive layer so that the cemented lens elements of the cemented lens group are slightly decentered relative to each other by an elastic deformation of the adhesive layer.

$$d < 0.2 \text{ mm} \tag{6}$$

If d is equal to or greater than the upper limit (=0.2 mm), the thickness of the adhesive layer becomes so thick as to make the cemented lens elements become eccentric largely relative to each other.

As mentioned above, the thickness of the adhesive layer can be set to a degree of the thickness of an adhesive layer of a conventional cemented lens group, depending on a difference in diameter between the positive lens element and the negative lens element of the cemented lens group or a difference in linear expansion coefficient between the positive lens element and the negative lens element of the cemented lens group.

The following condition (7) specifies a condition which defines the diameter of the cemented lens group according to the present invention to maximize the effectiveness thereof.

$$D > 80 \text{ mm} \tag{7};$$

wherein D represents the diameter of each of the cemented lens elements.

If D is equal to or smaller than the lower limit (=80 mm), there is no merit in producing such a cemented lens group in terms of the production cost since the thickness of the cemented lens group does not have to be increased.

The present invention can advantageously be applied to a cemented lens group in which a lens element of a typical glass material and a lens element of a glass material having a large linear expansion coefficient such as fluorite or a low-dispersion glass are cemented to each other, especially to such a cemented lens group in which a difference in linear expansion coefficient between the cemented lens elements is great.

The following condition (8) specifies a condition which defines a difference in linear expansion coefficient between the cemented lens elements.

$$|\Delta\alpha| > 0.0000015 \tag{8};$$

wherein $\Delta\alpha$ represents a difference in linear expansion coefficient between the two lens elements cemented to each other.

If $|\Delta\alpha|$ is equal to or smaller than the lower limit (=0.0000015), there is no merit in producing such a cemented lens group in terms of the production cost since the thickness of the cemented lens group does not have to be increased in the case where lens elements having a small difference in linear expansion coefficient therebetween are cemented to each other.

In the first embodiment of the cemented lens group shown in FIGS. 1 and 2, a silicon resin made of an organic silicon compound is used as an adhesive for the adhesive layer 13. Although various types silicon resins are available, silicon resins having stable chemical property and which become transparent when cured are suitable to a use for the adhesive of the adhesive layer. Specifically, an adhesive having a high elasticity after being cured that does not vary even in a low temperature is suitable for the adhesive of the adhesive layer when lens elements, each having a large diameter or having a large difference in linear expansion coefficient between the lens elements, are cemented to each other.

Silicon resins are roughly divided into two types in terms of the difference of the curing process: addition-reaction type that hardens by heat, and condensation-reaction type that hardens by reaction with moisture included in the air. If the latter type is used as an adhesive for cementing two lens elements, the adhesive does not easily harden at a central portion of the adhesive layer since moisture included in the air does not easily reach the central portion of the adhesive layer. On the other hand, some condensation-reaction type silicon resins harden at an ambient temperature, and are therefore suitable to be used for the adhesive of the adhesive layer.

It is desirable that a silicon resin having a high elasticity after being cured be used as an adhesive of the adhesive layer 13, such a silicon resin having an elongation of at least 100 percent.

According to the present invention, the thickness of the adhesive layer between the lens elements can be managed easily and precisely to absorb the shearing stress exerted on the cementing surfaces which is caused by expansion/contraction of the lens elements. Accordingly, the present invention is not limited solely to a particular case wherein the lens elements having a great difference in linear expansion coefficient between the cemented lens elements or the lens elements each having a large diameter are cemented to each other, but can be applied to a cemented lens group used under a wide temperature range to attain satisfactory results.

The present invention will be further discussed in detail with reference to specific examples of numerical data. In Tables 1, 2 and 3 below, FNo. designates the F-number, f designates the focal length, W designates the incident angle (°), FB designates the back focus, R designates the radius of curvature, D designates the lens-element thickness or distance between lens elements, Nd designates the refractive index at the d-line, and ν designates the Abbe constant. In the chromatic aberration diagrams, SA designates spherical aberration and SC designates the sine condition. In the aberration diagrams, the d-line, g-line and C-line at their respective wave-lengths show chromatic aberration due to spherical aberration.

[Numerical Data of First Embodiment]

Figure 3:
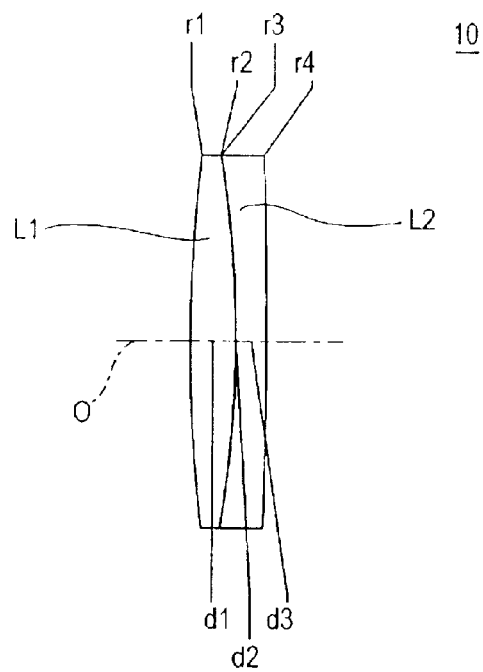
FIG. 3 is the optical arrangement of the first embodiment of the cemented lens group shown in FIG. 1.
Figure 4A:
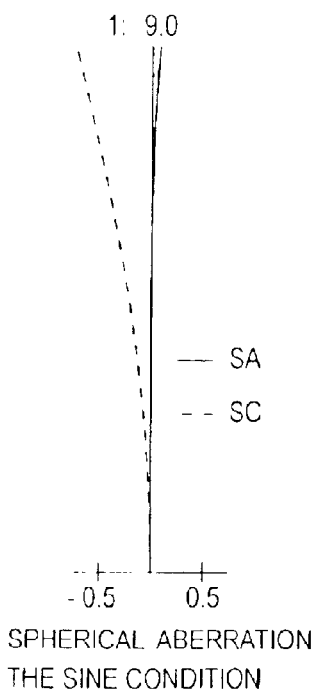
FIGS. 4A and 4B are diagrams of aberrations occurred in the first embodiment of the cemented lens group shown in FIG. 1.
Figure 4B:
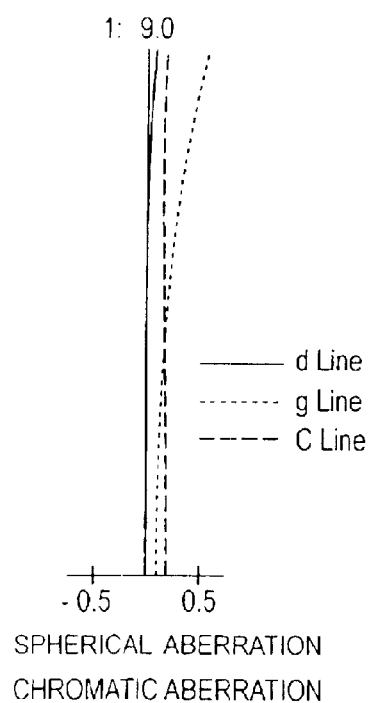

FIG. 3 shows the optical arrangement of the first embodiment of the cemented lens group shown in FIG. 1, FIGS. 4A and 4B are diagrams of aberrations occurred in the first embodiment of the cemented lens group shown in FIG. 3, and Table 1 below shows the numerical data of the embodiment shown in FIG. 3.

In the first embodiment of the cemented lens group, the first lens element (positive lens element) L1, which is made of an optical glass material FPL53 produced by OHARA INC., Japan, and the second lens element (negative lens element) L2, which is made from an optical glass material NSL36 produced by OHARA INC., Japan, are cemented to each other. An addition-reaction silicon resin KE109 produced by Shin-Etsu Chemical Co., Ltd., Japan, is used as an adhesive of the adhesive layer 13, and is cured at 40 degrees centigrade for 12 hours. The second surface of the first lens element L1 and the first surface of the second lens element L2 are those to which the addition-reaction silicon resin is applied, and the refractive index and Abbe constant of the adhesive layer between these surfaces are measured values. The diameter of each cementing surface is 100 mm, and the diameter of the cemented lens group 10 is 100 mm.

TABLE 1

Fno. = 1:9.0
F = 899.73
W = 1.40
FB = 888.23

| Surface No. | R | D | Nd | ν |
|---|---|---|---|---|
| 1 | 425.975 | 12.00 | 1.4388 | 95.0 |
| 2 | −309.261 | 0.10 | 1.356 | 34.4 |
| 3 | −309.261 | 8.00 | 1.5174 | 52.4 |
| 4 | −1532.722 | — | — | — |

[Numerical Data of Second Embodiment]

Figure 5:
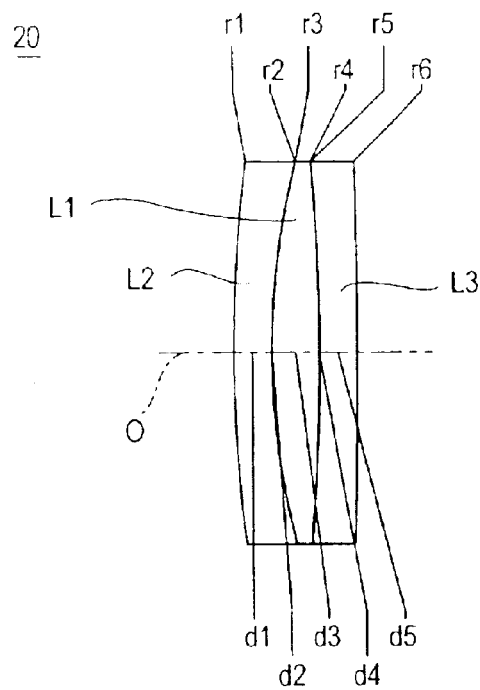
FIG. 5 is the optical arrangement of a second embodiment of the cemented lens group according to the present invention.
Figure 6A:
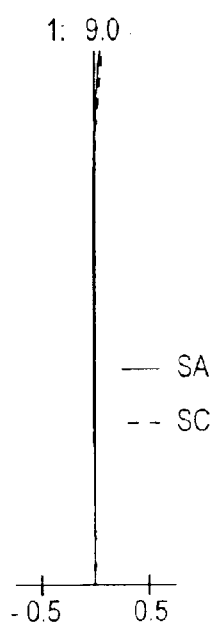
FIGS. 6A and 6B are diagrams of aberrations occurred in the second embodiment of the cemented lens group shown in FIG. 5.
Figure 6B:
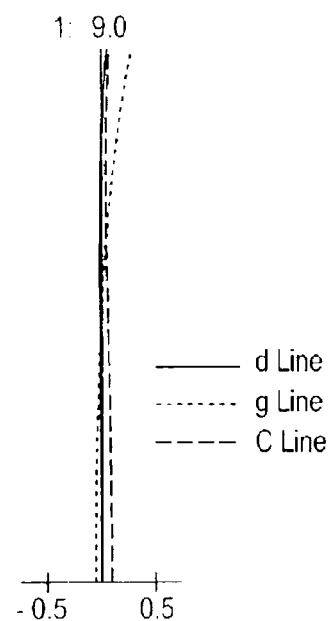

FIG. 5 shows the optical arrangement of the second embodiment of the cemented lens group, FIGS. 6A and 6B are diagrams of aberrations occurred in the second embodiment of the cemented lens group shown in FIG. 5, and Table 2 below shows the numerical data of the embodiment shown in FIG. 5. The cemented lens group 20 shown in FIG. 5 is an achromatic cemented lens group consisting of a first lens element L1 having negative power, a second lens element L2 having positive power, and a third lens element L3 having negative power, in that order from the object side (the left side as viewed in FIG. 5). The first lens element L1 is made of an optical glass material BSL7 (product type) produced by OHARA INC., Japan. The second lens element L2 is made of an optical glass material FPL53 produced by OHARA INC., Japan. The third lens element L3 is made of an optical glass material NSL36 produced by OHARA INC., Japan.

In the cemented lens group 20 shown in FIG. 5, the cementing surfaces between the first and second lens elements L1 and L2, the adhesive layer 13 positioned therebetween, the cementing surfaces between the second and third lens elements L2 and L3 and the adhesive layer 13 positioned therebetween are each formed according to the present invention. Namely, a second surface (concave surface) of the first lens element L1 and a first surface (convex surface) of the second lens element L2 are cemented to each other by an adhesive (the adhesive layer 13), and a second surface (convex surface) of the second lens element L2 and a first surface (concave surface) of the third lens element L3 are cemented to each other by an adhesive (the adhesive layer 13). The second surface (concave surface) of the first lens element L1 and the first surface (convex surface) of the second lens element L2 are formed to have the same radius of curvature, and also the first surface (concave surface) of the third lens element L3 and the second surface (convex surface) of the second lens element L2 are formed to have the same radius of curvature. The second surface of the first lens element L1 and the first surface of the second lens element L2 are cemented to each other so that the thickness of the adhesive layer 13 is 0.1 mm. Likewise, the first surface of the third lens element L3 and the second surface of the second lens element L2 are cemented to each other so that the thickness of the adhesive layer 13 becomes 0.1 mm. The diameter of each cementing surface is 100 mm, and the diameter of the cemented lens group 20 is 100 mm. The adhesive of each adhesive layer 13 and the conditions for curing the same in the second embodiment of the cemented lens group are the same as those of the first embodiment of the cemented lens group.

TABLE 2

Fno. = 1:9.0
F = 899.71
W = 1.40
FB = 878.61

| Surface No. | R | D | Nd | ν |
|---|---|---|---|---|
| 1 | 374.129 | 10.00 | 1.5163 | 64.1 |
| 2 | 195.890 | 0.10 | 1.356 | 34.4 |
| 3 | 195.890 | 12.50 | 1.4388 | 95.0 |
| 4 | −579.852 | 0.10 | 1.356 | 34.4 |
| 5 | −579.852 | 10.00 | 1.5174 | 52.4 |
| 6 | −1968.229 | — | — | — |

[Numerical Data of Third Embodiment]

Figure 7:
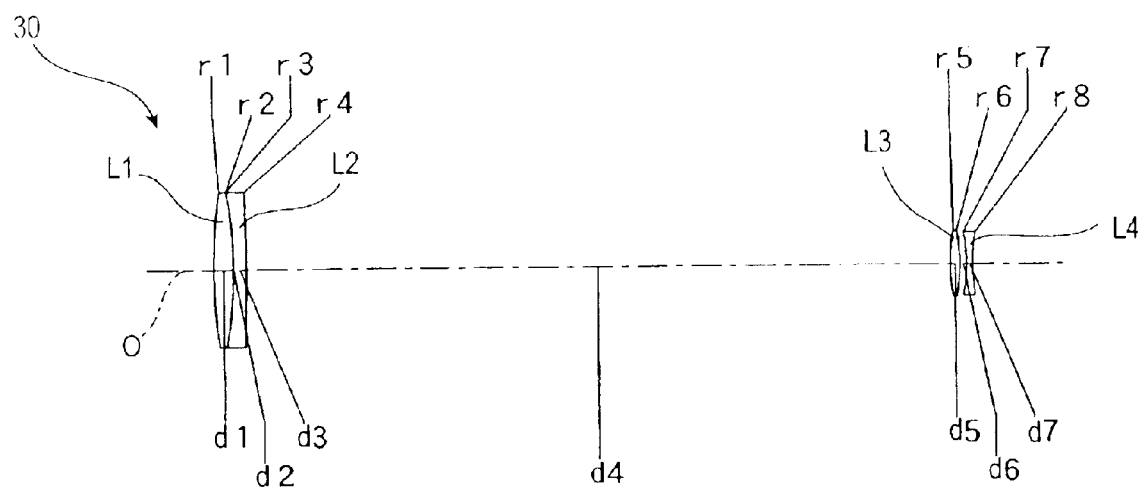
FIG. 7 is the optical arrangement of a lens system including the third embodiment of the cemented lens group according to the present invention.
Figure 8A:
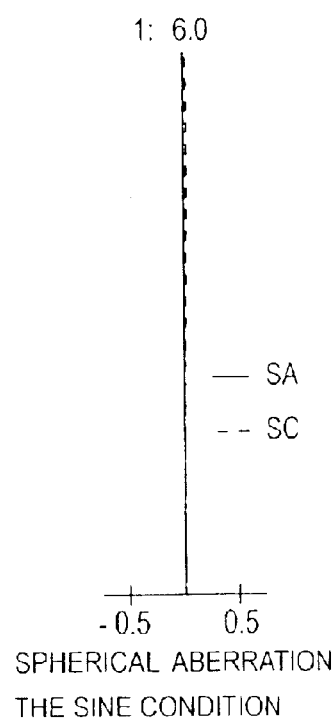
FIGS. 8A and 8B are diagrams of aberrations occurred in the third embodiment of the cemented lens group shown in FIG. 7.
Figure 8B:
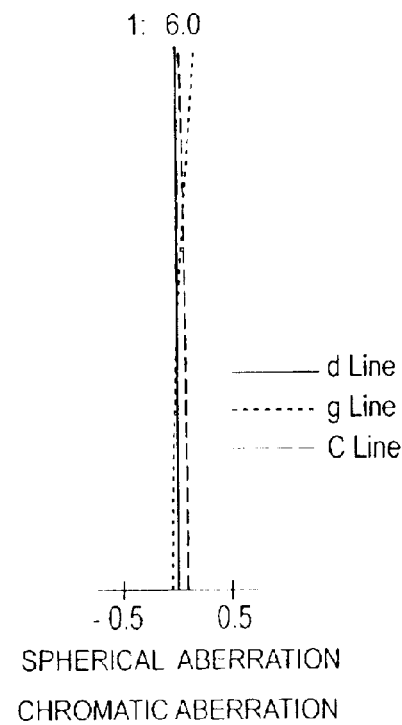

FIG. 7 shows the optical arrangement of a lens system including the third embodiment of the cemented lens group, FIGS. 8A and 8B are diagrams of aberrations occurred in the lens system shown in FIG. 7, and Table 3 below shows the numerical data of the embodiment shown in FIG. 7.

Figure 14:
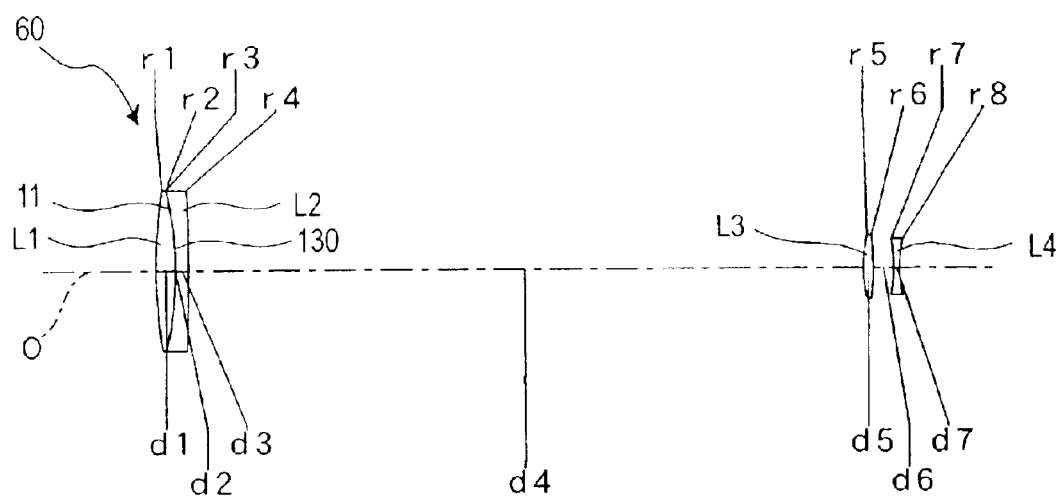
FIG. 14 is the optical arrangement of a lens system including a sixth embodiment of the cemented lens group according to the present invention.

In this lens system, a cemented lens group 30 consisting of first and second lens elements L1 and L2, a third lens element L3 and a fourth lens element L4 are arranged in that order from the object side (the left side as viewed in FIG. 14). As shown in FIG. 7, the third and fourth lens elements L3 and L4 are separate from each other, and positioned far behind the cemented lens group 60.

In the third embodiment of the cemented lens group, the first lens element (positive lens element) L1 is made of an optical glass material FPL53 produced by OHARA INC., Japan, and the second lens element (negative lens element) L2 is made from an optical glass material NSL36 produced by OHARA INC., Japan, which are cemented to each other to form the cemented lens group 30. The cementing surfaces between the first and second lens elements L1 and L2 and the adhesive layer 13 positioned therebetween are each formed according to the present invention. Namely, a second surface (convex surface) of the first lens element L1 and a first surface (concave surface) of the second lens element L2 are cemented to each other by an adhesive (the adhesive layer 13). The diameter of each lens elements is 100 mm.

In the third embodiment of the cemented lens group, the second surface (convex surface) of the first lens element L1 and the first surface (concave surface) of the second lens element L2 are formed to have the same radius of curvature. The second surface of the first lens element L1 and the first surface of the second lens element L2 are cemented to each other so that the thickness of the adhesive layer 13 is 0.1 mm. The adhesive of the adhesive layer 13 and the condition for curing the same in the third embodiment of the cemented lens group are the same as those of the first embodiment of the cemented lens group.

TABLE 3

Fno. = 1:6.0
F = 600.06
W = 2.10
FB = 228.01

| Surface No. | R | D | Nd | νd |
|---|---|---|---|---|
| 1 | 354.940 | 12.50 | 1.4388 | 95.0 |
| 2 | −279.126 | 0.10 | 1.356 | 34.4 |
| 3 | −279.126 | 8.00 | 1.5174 | 52.4 |

TABLE 3-continued

| 4 | −1793.782 | 453.80 | — | — |
| 5 | 117.859 | 6.00 | 1.4970 | 81.6 |
| 6 | −113.351 | 4.30 | — | — |
| 7 | −101.393 | 4.00 | 1.4875 | 70.2 |
| 8 | 145.248 | — | — | — |

Table 4 below shows specific numerical values in conditions (1) through (8) in the first through third embodiments which are represented by the numerical data shown in Tables 1 through 3, respectively.

TABLE 4

| | Embod. 1 | Embod. 2 (L1 + L2) | Embod. 2 (L2 + L3) | Embod. 3 |
|---|---|---|---|---|
| $\|\Delta\alpha \cdot /d\|$ | 0.0066 | 0.0068 | 0.0066 | 0.0066 |
| d/D | 0.001 | 0.001 | 0.001 | 0.001 |
| $\|\Delta\nu\|$ | 42.6 | 30.9 | 42.6 | 42.6 |
| $\|fc \cdot (1/fp \cdot \nu p) + 1/(fn \cdot \nu n))\|$ | 0.000196 | 0.00703 | 0.00822 | 0.00034 |
| d | 0.10 | 0.10 | 0.10 | 0.10 |
| D | 100.0 | 100.0 | 100.0 | 100.0 |
| $\|\Delta\alpha\|$ | 0.0000066 | 0.0000068 | 0.0000066 | 0.0000066 |
| $\alpha p$ | 0.0000142 | 0.0000142 | 0.0000142 | 0.0000142 |
| $\alpha n$ | 0.0000076 | 0.0000074 | 0.0000076 | 0.0000076 |
| $\nu p$ | 95.0 | 95.0 | 95.0 | 95.0 |
| $\nu n$ | 52.4 | 64.1 | 52.4 | 52.4 |
| $fc$ | 899.99 | 577.74 | 423.57 | 805.65 |
| $fp$ | 410.42 | 335.38 | 335.38 | 358.19 |
| $fn$ | −750.45 | −811.86 | −1592.6 | −640.02 |

As can be understood from Table 4, each condition of each embodiment has been satisfied, and as can be understood from the aberration diagrams, aberrations have been sufficiently corrected.

It should be noted that the aforementioned conditions (1), (1'), (2), (5) and (6), each of which includes the variable d, relate to the above described first through third embodiments of the cemented lens groups, and the above described conditions (3), (4), (7) and (8), each of which does not include the variable d, relate not only to the above described first through third embodiments of the cemented lens groups, but also for the fourth through sixth embodiments of the cemented lens groups which will be hereinafter discussed. In addition, conditions (9), (9'), (10), (11) and (12), each of which includes a variable d' and will be discussed later, relate to the fourth through sixth embodiments of the cemented lens groups.

Figure 9:
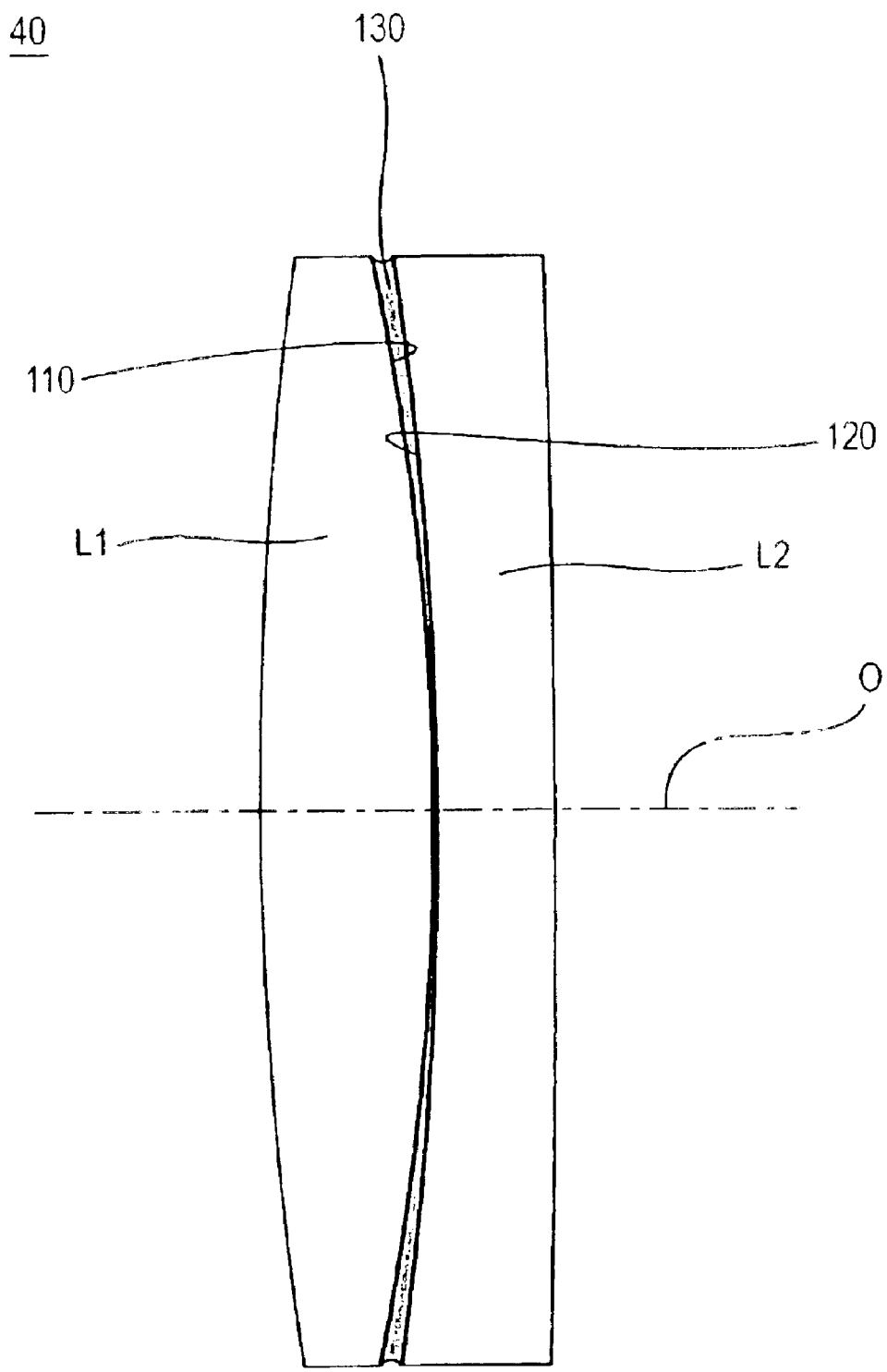
FIG. 9 is a cross-sectional view of a fourth embodiment of the cemented lens group according to the present invention.

FIG. 9 shows the fourth embodiment of the cemented lens group according to the present invention. The cemented lens group 40 consists of a first lens element L1 having positive power and a second lens element L2 having negative power, in that order from the object side (the left side as viewed in FIG. 9). A second surface (cementing surface) 110 of the first lens element L1, which is formed as a convex surface, and a first surface (cementing surface) 120 of the second lens element L2, which is formed as a concave surface, are cemented to each other by an adhesive to form the cemented lens group 40. The reference numeral "130" represents an adhesive layer.

The cementing surface 120 of the second lens element L2 is formed to have a radius of curvature greater than that of the cementing surface 110 of the first lens element L1.

Therefore, the two cementing surfaces 110 and 120 are in intimate contact with each other at an optical axis O of the cemented lens group 40, while the thickness of the adhesive layer 130 increases in radial directions away from the optical axis O (i.e., the space between the two cementing surfaces 110 and 120 increases in radial directions away from the optical axis O). The space between the two cementing surfaces 110 and 120 in FIG. 9 is exaggerated for the purpose of illustration.

With a difference in radius of curvature between the two cementing surfaces 110 and 120 which increases the space therebetween in radial directions away from the optical axis O, the thickness of the adhesive layer 130 increases in radial directions away from the optical axis O, even though the two cementing surfaces 110 and 120 are in intimate contact with each other at, and in the vicinity of, the optical axis O. Accordingly, a shearing stress exerted on the cementing surfaces 110 and 120 which increases in radial directions away from the optical axis O can be absorbed by the adhesive layer 130.

Moreover, with such a difference in radius of curvature between the two cementing surfaces 110 and 120 which increases the space therebetween in radial directions away from the optical axis O, the cemented lens group 40 has the advantage over a conventional cemented lens group in which the adhesive layer thereof is simply formed to have an even thickness. Namely, in the case where the adhesive layer is simply formed to have an even thickness, there is a possibility of the thickness becoming uneven, which may cause the lens elements of the cemented lens group to become eccentric with respect to each other to thereby deteriorate the optical performance of the cemented lens group. Moreover, if the adhesive is not distributed uniformly on the cementing surfaces therebetween, a shearing stress exerted on the cementing surfaces does not become even when such a shearing stress occurs. In this case, there is a possibility that the cemented lens group may become deformed, or in the worst scenario, the cementing surfaces may come off each other by the shearing stress. In contrast to this conventional cemented lens group, according to the fourth embodiment of the cemented lens group, the thickness of the adhesive layer at the periphery of the cementing surfaces 110 and 120 become automatically even in an alignment operation, in which the first and second lens elements L1 and L2 are aligned precisely, since the cemented lens group 40 is provided with a difference in radius of curvature between the two cementing surfaces 110 and 120 which increases the space therebetween in radial directions away from the optical axis O. Accordingly, the thickness of the adhesive layer between the lens elements can be easily managed without using any special jigs or tools.

The aforementioned alignment operation is generally performed when two lens elements of a cemented lens group are cemented to each other. Specifically, in a typical alignment operation, a liquid adhesive (e.g., an UV curing adhesive or a heat setting adhesive) is dropped onto one of the two cementing surfaces, and thereafter the other cementing surface is placed on this cementing surface. Subsequently, after air bubbles trapped in the adhesive are removed, one of the two lens elements is moved relative to another so that the optical axes of the two lens elements are precisely aligned. Finally, an adhesive hardening operation in which heat or ultraviolet rays are applied to the adhesive to harden the same is performed. Accordingly, the fourth embodiment of the cemented lens group does not require any special operation or process other than the typical alignment operation.

The fourth embodiment of the cemented lens group will be further discussed in detail with reference to Table 5 below and FIGS. 10, 11A and 11B. The first lens element L1 is made from an optical glass material "FPL53" produced by OHARA INC., Japan. The second lens element L2 is made from an optical glass material "NSL36" produced by OHARA INC., Japan. These two lens elements L1 and L2 are cemented to each other to form the cemented lens group 40 serving as an achromatic lens. The diameter of the cemented lens group 40 is 100 mm, wherein the diameter of each of the lens elements L1 and L2 is 100 mm. The radius of curvature of the cementing surface 120 (the first surface of the second lens element L2) is greater than that of the cementing surface 110 (the second surface of the first lens element L1). The cementing surfaces 110 and 120 are in intimate contact with each other at the respective centers thereof, namely, the thickness of the adhesive layer 130 is set at substantially zero at the optical axis O of the cemented lens group 40, while the thickness of the adhesive layer 130 is set at 0.1 mm at the periphery of the cementing surfaces 110 and 120. An addition-reaction silicon resin "KE109" produced by Shin-Etsu Chemical Co., Ltd., Japan, is used as an adhesive of the adhesive layer 130, and is cured at 40 degrees centigrade for 12 hours.

The thermal expansion coefficient of FPL53 is $142 \times 10^{-7}$. The thermal expansion coefficient of NSL36 is $76 \times 10^{-7}$. Therefore, if the temperature of the cemented lens group 40 drops from 40 degrees centigrade (temperature at cementing time) to 10 degrees centigrade, the first lens element L1 is contracted so that the diameter thereof decreases by 0.043 mm while the second lens element L2 is contracted so that the diameter thereof decreases by 0.023 mm. Consequently, a difference of 0.02 mm in diameter occurs between the first and second lens elements L1 and L2. This difference causes the periphery of the cementing surfaces 110 and 120 to be mutually displaced by 0.01 mm in a radial direction with respect to the optical axis O. This displacement becomes a cause of exerting a shearing stress on the cementing surfaces 110 and 120 in radial directions. The shearing stress is small in the vicinity of the optical axis O, increases in radial directions away from the optical axis O, and is maximum at the outer edge of the cemented lens group.

In contrast to such conventional cemented lens groups, the radial displacement between the periphery of the cementing surfaces 110 and 120 is approximately one tenth of the thickness of the adhesive layer 130, and the adhesive layer 130 of the aforementioned addition-reaction silicon resin KE109 can expand by 150 percent. Accordingly, the adhesive layer 130 can fully absorb a radial displacement between the periphery of the cementing surfaces 110 and 120 which is caused by expansion/contraction of the first and second lens elements L1 and L2.

If it is assumed that the adhesive of the adhesive layer between the two lens elements has elasticity, and an elongation of at least 100 percent, the shearing stress exerted on the adhesive layer can be absorbed sufficiently by the elasticity of the adhesive layer if the thickness of the adhesive layer is more than double the displacement ($\Delta h$) at the periphery of the cementing surfaces. Namely, the shearing stress exerted on the cementing surfaces which is caused by expansion/contraction of the two lens elements can be absorbed sufficiently by satisfying the following condition (D):

$$2 \cdot |\Delta h| < d' \tag{D}$$

wherein d' represents the thickness of the adhesive layer at the periphery of the cementing surfaces.

From the equation (A) and condition (D), the following condition (E) is derived:

$$|\Delta \alpha \cdot D/d'| < 1/\Delta T \tag{E}$$

The following condition (9) shows a case where the condition (E) is satisfied when it is assumed that the range of temperature variation of the cemented lens group is 30 degrees centigrade.

$$|\Delta \alpha \cdot D/d'| < 0.03 \tag{9}$$

Accordingly, defining the numerical values of the variables in condition (E) makes it possible for the adhesive layer to sufficiently absorb the shearing stress exerted on the cementing surfaces which is caused by expansion/contraction of the two lens elements.

If $|\Delta \alpha \cdot D/d'|$ in condition (9) is equal to or greater than the upper limit (=0.03), the thickness of the adhesive layer becomes so small that the adhesive layer cannot absorb the shearing stress exerted on the cementing surfaces.

If the workability of cementing the lens elements, the environment, the optical performance of the adhesive of the adhesive layer, the cost of production and so forth are taken into consideration, an optimum adhesive having an ideal elasticity cannot always be used. In this case, it is desirable that the thickness of the adhesive layer be determined by the following condition (9'):

$$|\Delta \alpha \cdot D/d'| < 0.01 \tag{9'}$$

If $|\Delta \alpha \cdot D/d'|$ in condition (9') is equal to or greater than the upper limit (=0.01), the thickness of the adhesive layer becomes so small that the adhesive layer cannot absorb the shearing stress exerted on the cementing surfaces, depending on the elasticity of the adhesive of the adhesive layer.

When the lens elements of the cemented lens group are cemented to each other by an adhesive which becomes elastic after being cured, the adhesive layer is deformed by the own weight of each lens element to thereby cause the cemented lens elements to become eccentric with respect to each other if the adhesive layer is excessively thick. To prevent this problem from occurring, defining the thickness of the adhesive layer as an optimum thickness using the following condition (10) makes it possible to reduce the eccentricity.

$$d'/D < 0.002 \tag{10}$$

If d'/D is equal to or greater than the upper limit (=0.002), the adhesive layer becomes excessively thick, so as to cause the cemented lens elements to become eccentric relative to each other to thereby deteriorate the optical performance of the cemented lens group.

Although the lower limit of the thickness of the adhesive layer at the periphery of the cementing surfaces is determined by conditions (9) or (9'), the thickness of the adhesive layer can be set to a degree of the thickness of an adhesive layer of a conventional cemented lens group, depending on a difference in diameter between the cemented lens elements of the cemented lens group or a difference in linear expansion coefficient between cemented lens elements of the cemented lens group.

The following condition (1) specifies a condition which defines the lower limit of the optimum thickness of the adhesive layer of the cemented lens group at the periphery of the cementing surfaces.

$$d' > 0.015 \text{ mm} \tag{11};$$

wherein d' represents the thickness of the adhesive layer.

If d' is equal to or smaller than the lower limit (=0.015 mm), there is no merit in producing such a cemented lens group according to the present invention in terms of the production cost since the thickness of the adhesive layer can be reduced to a degree of the thickness of an adhesive layer of a conventional cemented lens group.

Although the upper limit of the thickness of the adhesive layer at the periphery of the cementing surfaces is determined by condition (10), there is a possibility of the adhesive layer becoming so thick that the cemented lens elements become largely decentered relative to each other due to an elastic deformation of the adhesive layer, depending on a difference in diameter between the cemented lens elements or a difference in linear expansion coefficient between the cemented lens elements.

The following condition (12) specifies a condition which defines the upper limit of the thickness of the adhesive layer at the periphery of the cementing surfaces so that the cemented lens elements of the cemented lens group are slightly decentered relative to each other by an elastic deformation of the adhesive layer.

$$d' < 0.2 \text{ mm} \quad (12)$$

If d' is equal to or greater than the upper limit (=0.2 mm), the thickness of the adhesive layer becomes excessively thick, so as to cause the cemented lens elements become excessively eccentric relative to each other.

Similar to the first embodiment of the cemented lens group shown in FIGS. 1 and 2, in the fourth embodiment of the cemented lens group shown in FIG. 9, a silicon resin made of an organic silicon compound is used as an adhesive of the adhesive layer 130. Although various types silicon resins are available, silicon resins having stable chemical property and which become transparent when cured are suitable to a use for the adhesive of the adhesive layer. Specifically, an adhesive having a high elasticity after being cured that does not vary even in a low temperature is suitable to a use for the adhesive of the adhesive layer when lens elements, each having a large diameter or having a large difference in linear expansion coefficient between the lens elements, are cemented to each other.

It is desirable that a silicon resin having a high elasticity be used as an adhesive of the adhesive layer 130, such a silicon resin having an elongation of at least 100 percent.

According to the present invention, the thickness of the adhesive layer between the lens elements can be managed easily and precisely to absorb the shearing stress exerted on the cementing surfaces which is caused by expansion/contraction of the lens elements. Accordingly, the present invention is not limited solely to a particular case wherein the lens elements having a great difference in linear expansion coefficient between the cemented lens elements or the lens elements each having a large diameter are cemented to each other, but can be applied to a cemented lens group used under a wide temperature range to attain satisfactory results.

[Numerical Data of Fourth Embodiment]

Figure 10:
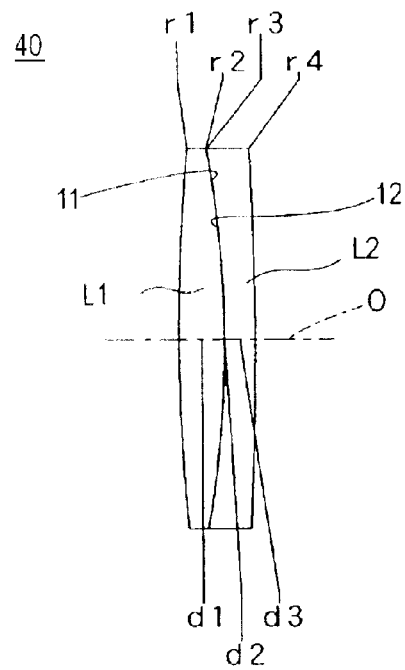
FIG. 10 is the optical arrangement of the fourth embodiment of the cemented lens group shown in FIG. 9.
Figure 11A:
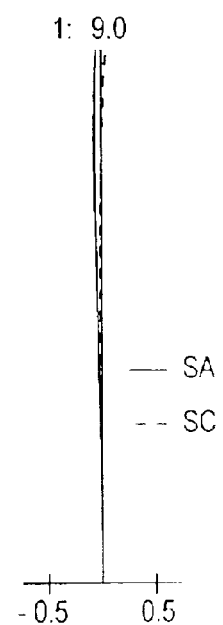
FIGS. 11A and 11B are diagrams of aberrations occurred in the fourth embodiment of the cemented lens group shown in FIG. 9.
Figure 11B:
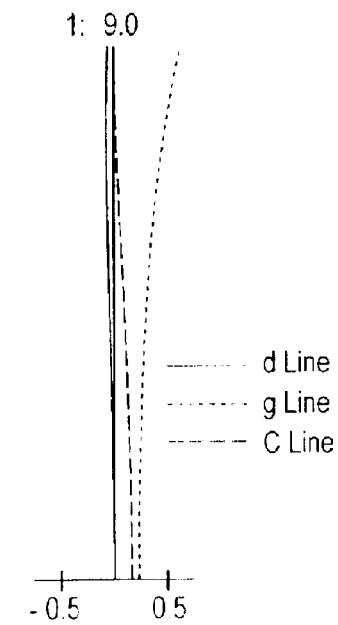

FIG. 10 shows the optical arrangement of the fourth embodiment of the cemented lens group shown in FIG. 9, FIGS. 11A and 11B are diagrams of aberrations occurred in the fourth embodiment of the cemented lens group shown in FIG. 10, and Table 5 below shows the numerical data of the embodiment shown in FIG. 10.

In the fourth embodiment of the cemented lens group, the first lens element (positive lens element) L1, which is made of an optical glass material FPL53 produced by OHARA INC., Japan, and the second lens element (negative lens element) L2, which is made from an optical glass material NSL36 produced by OHARA INC., Japan, are cemented to each other. The radius of curvature of the cementing surface 120 (the first surface of the second lens element L2) is greater than that of the cementing surface 110 (the second surface of the first lens element L1). The thickness of the adhesive layer 130 is set at 0.1 mm at the periphery of the cementing surfaces 110 and 120. The cementing surfaces 110 and 120 are in contact with each other at the optical axis O so that the thickness of the adhesive layer 130 becomes substantially zero in the vicinity of the optical axis O. An addition-reaction silicon resin KE109 produced by Shin-Etsu Chemical Co., Ltd., Japan is used as an adhesive of the adhesive layer 130, and is cured at 40 degrees centigrade for 12 hours. The second surface of the first lens element L1 and the first surface of the second lens element L2 are those to which the addition-reaction silicon resin is applied, and the refractive index and Abbe constant of the adhesive layer between these surfaces are measured values. The diameter of each lens elements L1 and L2 is 100 mm.

TABLE 5

Fno. = 1:9.0
F = 899.87
W = 1.40
FB = 890.70

| Surface No. | R | D | Nd | ν |
|---|---|---|---|---|
| 1 | 514.402 | 12.00 | 1.4388 | 95.0 |
| 2 | −277.906 | 0.00 | 1.356 | 34.4 |
| 3 | −283.697 | 8.00 | 1.5174 | 52.4 |
| 4 | −970.939 | — | — | — |

[Numerical Data of Fifth Embodiment]

Figure 12:
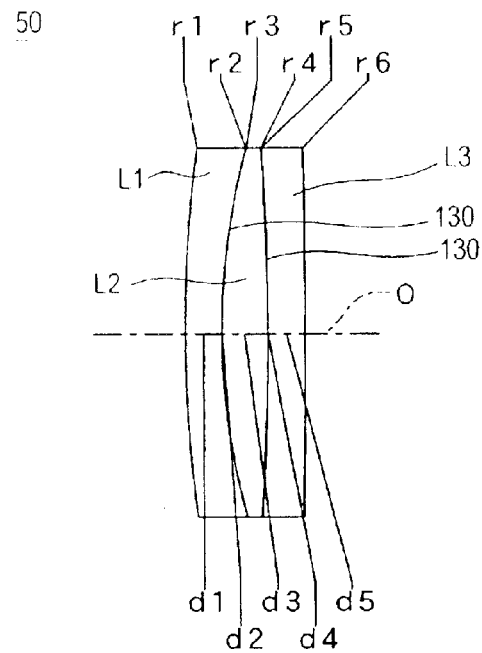
FIG. 12 is the optical arrangement of a fifth embodiment of the cemented lens group according to the present invention.
Figure 13A:
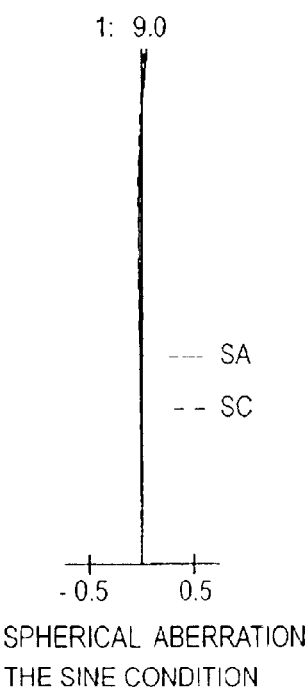
FIGS. 13A and 13B are diagrams of aberrations occurred in the fifth embodiment of the cemented lens group shown in FIG. 12.
Figure 13B:
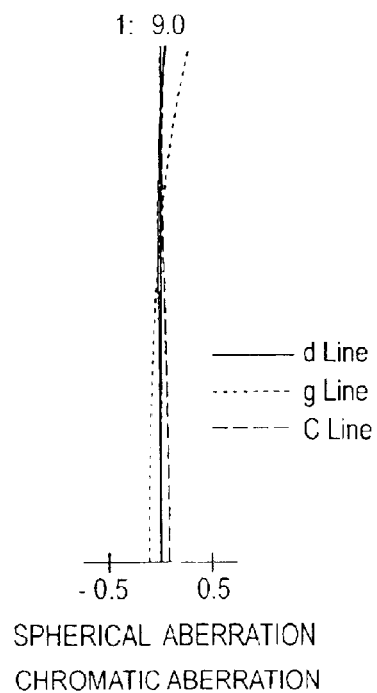

FIG. 12 shows the optical arrangement of the fifth embodiment of the cemented lens group, FIGS. 13A and 13B are diagrams of aberrations occurred in the fifth embodiment of the cemented lens group shown in FIG. 12, and Table 6 below shows the numerical data of the embodiment shown in FIG. 12.

The cemented lens group 50 shown in FIG. 12 is an achromatic cemented lens group consisting of a first lens element L1 having negative power, a second lens element L2 having positive power, and a third lens element L3 having negative power, in that order from the object side (the left side as viewed in FIG. 12). The first lens element L1 is made of an optical glass material BSL7 (product type) produced by OHARA INC., Japan. The second lens element L2 is made of an optical glass material FPL53 produced by OHARA INC., Japan. The third lens element L3 is made of an optical glass material NSL36 produced by OHARA INC., Japan. The diameter of each cementing surface is 100 mm, and the diameter of the cemented lens group 50 is 100 mm.

In the cemented lens group 50 shown in FIG. 12, the cementing surfaces between the first and second lens elements L1 and L2, the adhesive layer 130 positioned therebetween, the cementing surfaces between the second and third lens elements L2 and L3 and the adhesive layer 130 positioned therebetween are each formed according to the present invention.

Namely, a second surface (concave surface) of the first lens element L1 and a first surface (convex surface) of the second lens element L2 are cemented to each other by an adhesive (the adhesive layer 130), and a second surface (convex surface) of the second lens element L2 and a first surface (concave surface) of the third lens element L3 are cemented to each other by an adhesive (the adhesive layer 130). The second surface (concave surface) of the first lens element L1 is formed to have a radius of curvature greater than that of the first surface (convex surface) of the second lens element L2, and the first surface (concave surface) of the third lens element L3 is formed to have a radius of curvature greater than that of the second surface (convex surface) of the second lens element L2. These radius of curvatures are determined so that the thickness of each adhesive layer 130 is 0.1 mm at the periphery of the cementing surfaces when the respective sets of cementing surfaces are cemented to each other so that the thickness of the adhesive layer becomes substantially zero at the optical axis O. The adhesive of each adhesive layer 130 and the condition for curing the same in the fifth embodiment of the cemented lens group are the same as those in the fourth embodiment of the cemented lens group.

TABLE 6

Fno. = 1:9.0
F = 899.66
W = 1.40
FB = 877.79

| Surface No. | R | D | Nd | ν |
|---|---|---|---|---|
| 1 | 362.797 | 10.00 | 1.5163 | 64.1 |
| 2 | 184.898 | 0.00 | 1.356 | 34.4 |
| 3 | 182.269 | 12.50 | 1.4388 | 95.0 |
| 4 | −773.864 | 0.00 | 1.356 | 34.4 |
| 5 | −826.356 | 10.00 | 1.5174 | 52.4 |
| 6 | −2744.353 | — | — | — |

[Numerical Data of Sixth Embodiment]

Figure 15A:
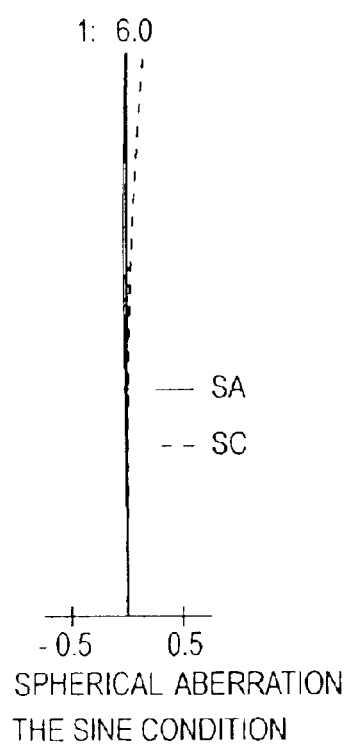
FIGS. 15A and 15B are diagrams of aberrations occurred in the sixth embodiment of the cemented lens group shown in FIG. 14.
Figure 15B:
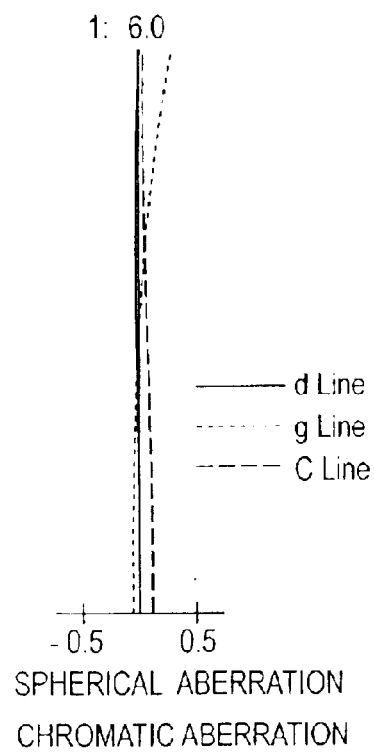

FIG. 14 is the optical arrangement of a lens system including the sixth embodiment of the cemented lens group, FIGS. 15A and 15B are diagrams of aberrations occurred in the lens system shown in FIG. 14, and Table 7 below shows the numerical data of the embodiment shown in FIG. 14.

In this lens system, a cemented lens group 60 consisting of first and second lens elements L1 and L2, a third lens element L3 and a fourth lens element L4 are arranged in that order from the object side (the left side as viewed in FIG. 14). As shown in FIG. 14, the third and fourth lens elements L3 and L4 are separate from each other, and positioned far behind the cemented lens group 60.

In the sixth embodiment of the cemented lens group, the first lens element (positive lens element) L1 is made from an optical glass material FPL53 produced by OHARA INC., Japan, and the second lens element (negative lens element) L2 is made from an optical glass material NSL36 produced by OHARA INC., Japan, which are cemented to each other to form the cemented lens group 60. The cementing surfaces between the first and second lens elements L1 and L2 and the adhesive layer 130 positioned therebetween are each formed according to the present invention. Namely, a second surface (convex surface) of the first lens element L1 and a first surface (concave surface) of the second lens element L2 are cemented to each other by an adhesive (the adhesive layer 130). The first surface (concave surface) of the second lens element L2 is formed to have a radius of curvature greater than that of the second surface (convex surface) of the first lens element L1. These radius of curvatures are determined so that the thickness of the adhesive layer 130 is 0.1 mm at the periphery of the cementing surfaces when the cementing surfaces are cemented to each other so that the thickness of the adhesive layer becomes substantially zero at the optical axis O. The adhesive of the adhesive layer 130 and the condition for curing the same in the sixth embodiment of the cemented lens group are the same as those in the fourth embodiment of the cemented lens group. The diameter of each lens elements L1 and L2 is 100 mm.

TABLE 7

Fno. = 1:6.0
F = 599.84
W = 2.10
FB = 183.60

| Surface No. | R | D | Nd | ν |
|---|---|---|---|---|
| 1 | 324.396 | 12.00 | 1.4388 | 95.0 |
| 2 | −227.303 | 0.00 | 1.356 | 34.4 |
| 3 | −231.242 | 8.00 | 1.5174 | 52.4 |
| 4 | −1290.300 | 419.30 | — | — |
| 5 | 85.415 | 6.00 | 1.4970 | 81.6 |
| 6 | −178.281 | 12.50 | — | — |
| 7 | −120.133 | 4.00 | 1.4875 | 70.2 |
| 8 | 83.902 | — | — | — |

Table 8 below shows specific numerical values in conditions (1) through (8) in the fourth through sixth embodiments which are represented by the numerical data shown in Table 5 through 7, respectively.

TABLE 8

| | Embod. 1 | Embod. 2 (L1 + L2) | Embod. 2 (L2 + L3) | Embod. 3 |
|---|---|---|---|---|
| $|\Delta\alpha \cdot D/d'|$ | 0.0066 | 0.0068 | 0.0066 | 0.0066 |
| $d'/D$ | 0.001 | 0.001 | 0.001 | 0.001 |
| $|\Delta\nu|$ | 42.6 | 30.9 | 42.6 | 42.6 |
| $|fc \cdot (1/(fp \cdot \nu p) + 1/(fn \cdot \nu n))|$ | 0.000902 | 0.00651 | 0.00913 | 0.000447 |
| d' | 0.10 | 0.10 | 0.10 | 0.10 |
| D | 100.0 | 100.0 | 100.0 | 100.0 |
| $|\Delta\alpha|$ | 0.0000066 | 0.0000068 | 0.0000066 | 0.0000066 |
| αp | 0.0000142 | 0.0000142 | 0.0000142 | 0.0000142 |
| αn | 0.0000076 | 0.0000074 | 0.0000076 | 0.0000076 |
| νp | 95.0 | 95.0 | 95.0 | 95.0 |
| νn | 52.4 | 64.1 | 52.4 | 52.4 |
| fc | 899.99 | 636.70 | 399.63 | 705.91 |
| fp | 413.14 | 337.58 | 337.58 | 306.66 |
| fn | −777.72 | −744.54 | −2289.23 | −545.90 |

As can be understood from Table 8, each condition of each embodiment has been satisfied, and as can be understood from the aberration diagrams, aberrations have been sufficiently corrected.

As can be understood from the above description, a cemented lens group is achieved in which there is substantially no possibility that the cemented lens group is deformed nor that the cementing surfaces will come off each other by a shearing stress exerted on the cementing surfaces.

Moreover, according to the present invention, an achromatic cemented lens group requiring a high optical performance wherein the optical performance deteriorates little even if the adhesive layer, via which two lens elements of the cemented lens group are cemented to each other, is elastically deformed is achieved.

Furthermore, according to the present invention, a cemented lens group wherein the thickness of the adhesive layer between the lens elements can be easily managed is achieved.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A cemented lens group comprising two lens elements, cementing surfaces of said two lens elements being cemented to each other by an adhesive;
   wherein an adhesive layer formed by said adhesive between said two lens elements has elasticity; and
   wherein the following condition(1) is satisfied:

$$|\Delta\alpha \cdot D/d|<0.03 \tag{1};$$

wherein $\Delta\alpha$ designates a difference in linear expansion coefficient between said two lens elements cemented to each other;
   D designates the diameter of each of said lens elements; and
   d designates a thickness of said adhesive layer,
   wherein the following condition (2) is satisfied:

$$d/D<0.02 \tag{2}.$$

2. The cemented lens group according to claim 1, wherein the following condition (1') is satisfied:

$$|\Delta\alpha \cdot D/d|<0.01 \tag{1'}.$$

3. The cemented lens group according to claim 1, wherein said two lens elements comprise a positive lens element and a negative lens element, respectively, and wherein the following condition (3) is satisfied:

$$|\Delta\nu|>20 \tag{3}$$

wherein $\Delta\nu$ represents a difference in Abbe constant between said positive lens element and said negative lens element.

4. The cemented lens group according to claim 3, wherein the following condition (4) is satisfied;

$$|fc \cdot (1/fp \cdot \nu p) + 1/(fn \cdot \nu n)|<0.02 \tag{4}$$

wherein fc designates a focal length of said cemented lens group;
   fp designates a focal length of said positive lens element;
   fn designates a focal length of said negative lens element;
   $\nu p$ designates Abbe constant of said positive lens element; and
   $\nu n$ designates Abbe constant of said negative lens element.

5. The cemented lens group according to claim 1, wherein the following condition (5) is satisfied:

$$d>0.015 \text{ mm} \tag{5}.$$

6. The cemented lens group according to claim 1, wherein the following condition (6) is satisfied:

$$d<0.2 \text{ mm} \tag{6}.$$

7. The cemented lens group according to claim 1, wherein the following condition (7) is satisfied:

$$D>80 \text{ mm} \tag{7}.$$

8. The cemented lens group according to claim 1, wherein the following condition (8) is satisfied:

$$|\Delta\alpha|>0.0000015 \tag{8}.$$

9. The cemented lens group according to claim 1, wherein said adhesive comprises a silicon resin made of an organic silicon compound.

10. The cemented lens group according to claim 9, wherein said adhesive comprises an addition-reaction silicon resin.

11. The cemented lens group according to claim 1, wherein said adhesive comprises a silicon resin having an elongation of at least 100 percent.

12. The cemented lens group according to claim 1, wherein said cementing surfaces comprise a convex surface and a concave surface;
    wherein a radius of curvature of said concave surface is greater than a radius of curvature of said convex surface.

13. A cemented lens group including two lens elements, cementing surfaces of said two lens elements being cemented to each other by an adhesive;
    wherein a radius of curvature of each said cementing surfaces is determined so that a space between said cementing surfaces in the vicinity of periphery of said cementing surfaces becomes greater than a space between said cementing surfaces at an optical axis of said cemented lens group;
    wherein an adhesive layer formed by said adhesive between said two lens elements has elasticity; and
    wherein the following condition (9) is satisfied:

$$|\Delta\alpha \cdot D/d'|<0.03 \tag{9}$$

wherein $\Delta\alpha$ designates a difference in linear expansion coefficient between said two lens elements cemented to each other;
    D designates a diameter of each of said lens elements; and
    d' represents a thickness of said adhesive layer at said periphery of said cementing surfaces,
    wherein the following condition (10) is satisfied:

$$d'/D<0.002 \tag{10}.$$

14. The cemented lens group according to claim 13, wherein the following condition (9') is satisfied:

$$|\Delta\alpha \cdot D/d'|<0.01 \tag{9'}.$$

15. The cemented lens group according to claim 13, wherein said cementing surfaces are cemented to each other after said two lens elements are precisely aligned.

16. The cemented lens group according to claim 13, wherein said two lens elements comprise a positive lens element and a negative lens element, respectively, and wherein the following condition (3) is satisfied:

$$|\Delta\nu|>20 \tag{3}$$

wherein $\Delta\nu$ designates a difference in Abbe constant between said positive lens element and said negative lens element.

17. The cemented lens group according to claim 16, wherein the following condition (4) is satisfied:

$$|fc \cdot (1/fp \cdot vp) + 1/(fn \cdot vn)| < 0.02 \quad (4)$$

wherein fc designates a focal length of said cemented lens group;
fp designates a focal length of said positive lens element;
fn designates a focal length of said negative lens element;
vp designates Abbe constant of said positive lens element; and
vn designates Abbe constant of said negative lens element.

18. The cemented lens group according to claim 13, wherein the following condition (11) is satisfied:

$$d' > 0.015 \text{ mm} \quad (11).$$

19. The cemented lens group according to claim 13, wherein the following condition (12) is satisfied:

$$d' < 0.2 \text{mm} \quad (12).$$

20. The cemented lens group according to claim 13, wherein the following condition (7) is satisfied:

$$D > 80 \text{ mm} \quad (7).$$

21. The cemented lens group according to claim 13, wherein the following condition (8) is satisfied:

$$|\Delta \alpha| > 0.0000015 \quad (8).$$

22. The cemented lens group according to claim 13, wherein said adhesive comprises a silicon resin made of an organic silicon compound.

23. The cemented lens group according to claim 22, wherein said adhesive comprises an addition-reaction silicon resin.

24. The cemented lens group according to claim 13, wherein said adhesive comprises a silicon resin having an elongation of at least 100 percent.

25. The cemented lens group according to claim 13, wherein said radius of curvature of each said cementing surfaces is determined so that a space between said cementing surfaces increases in radial directions away from an optical axis of said cemented lens group.

26. The cemented lens group according to claim 13, wherein said cementing surfaces comprise a convex surface and a concave surface;
wherein a radius of curvature of said concave surface is greater than a radius of curvature of said convex surface.

* * * * *